United States Patent
Johnson (10) Patent No.: US 9,110,676 B2
(45) Date of Patent: *Aug. 18, 2015

(54) METHOD AND SYSTEM FOR SYNTAX ERROR REPAIR IN PROGRAMMING LANGUAGES

(71) Applicant: The MathWorks, Inc., Natick, MA (US)

(72) Inventor: Stephen Curtis Johnson, Natick, MA (US)

(73) Assignee: The MathWorks, Inc., Natick, MA (US)

(*) Notice: Subject to any disclaimer, the term of this patent is extended or adjusted under 35 U.S.C. 154(b) by 245 days.

This patent is subject to a terminal disclaimer.

(21) Appl. No.: 13/678,125

(22) Filed: Nov. 15, 2012

(65) Prior Publication Data

US 2013/0074054 A1    Mar. 21, 2013

Related U.S. Application Data

(63) Continuation of application No. 12/425,054, filed on Apr. 16, 2009, now Pat. No. 8,321,848.

(51) Int. Cl.
  *G06F 9/45* (2006.01)

(52) U.S. Cl.
  CPC .............. *G06F 8/427* (2013.01); *G06F 8/425* (2013.01)

(58) Field of Classification Search
  CPC .............................. G06F 17/277; G06F 8/425
  USPC ................... 717/143; 714/2, 52; 707/602, 812
  See application file for complete search history.

(56) References Cited

U.S. PATENT DOCUMENTS

| | | | |
|---|---|---|---|
| 5,487,147 A | 1/1996 | Brisson | |
| 5,737,608 A | 4/1998 | Van De Vanter | |
| 6,016,467 A | 1/2000 | Newsted et al. | |
| 6,029,002 A * | 2/2000 | Afifi et al. | 717/131 |

(Continued)

OTHER PUBLICATIONS

A Practical Method for LR and LL Syntactic Error Diagnosis and Recovery—Michael G. Burke and Gerald A. Fisher, Thomas J. Watson Research Center—ACM Transactions on Programming Languages and Systems, vol. 9, No. 2, Apr. 1987.*

(Continued)

*Primary Examiner* — Lewis A Bullock, Jr.
*Assistant Examiner* — Francisco Aponte
(74) *Attorney, Agent, or Firm* — Cesari amd McKenna, LLP; Michael R. Reinemann (57) ABSTRACT

The described embodiments present techniques for recovering from syntax errors. These techniques correct potential errors while preserving the shape of the parse tree, and the specific implementation of the techniques can be automatically generated from the grammar. These techniques may operate by looking back at states associated with previously-received tokens to determine pair matching status, when a synchronizing symbol is received. The techniques can respond to the pair matching status determination by potentially adding a synthesized token or by deleting a token that has already been received. The techniques may use a structure referred to herein as a tuple to assist with the evaluation of the pair matching status. Some of the techniques utilize indentation information to evaluate the pair matching status, while other techniques ignore such information. The described embodiments also include a technique for automatically generating the tuples from a set of grammar rules associated with the parser.

20 Claims, 5 Drawing Sheets

(56) References Cited

U.S. PATENT DOCUMENTS

| | | | |
|---|---|---|---|
| 6,513,002 | B1 | 1/2003 | Gillam |
| 6,721,697 | B1 * | 4/2004 | Duan et al. ............... 704/9 |
| 6,886,115 | B2 * | 4/2005 | Kondoh et al. ............ 714/52 |
| 7,043,720 | B2 | 5/2006 | Kuzmin |
| 7,093,231 | B2 * | 8/2006 | Nuss ....................... 717/114 |
| 7,209,925 | B2 * | 4/2007 | Srinivasan et al. ......... 707/602 |
| 7,376,551 | B2 | 5/2008 | Powell et al. |
| 7,430,504 | B2 * | 9/2008 | Vanderwende et al. ...... 704/9 |
| 2003/0149562 | A1 * | 8/2003 | Walther ................... 704/243 |
| 2006/0116862 | A1 * | 6/2006 | Carrier et al. ............. 704/1 |
| 2006/0117307 | A1 * | 6/2006 | Averbuch et al. .......... 717/143 |
| 2007/0006151 | A1 * | 1/2007 | Conway et al. ............ 717/120 |
| 2007/0022414 | A1 * | 1/2007 | Bird ....................... 717/143 |
| 2007/0157182 | A1 * | 7/2007 | Zatloukal et al. .......... 717/140 |
| 2007/0169038 | A1 * | 7/2007 | Shankar et al. ............ 717/143 |
| 2010/0088680 | A1 * | 4/2010 | Ganai et al. .............. 717/126 |

OTHER PUBLICATIONS

A Practical Method for Syntactic Error Diagnosis and Recovery—Michael Burke, Gerald A. Fisher Jr.—Courant Institute New York University—Jun. 6, 1982.*

Syntax Error Handling in Scannerless Generalized LR Parsers—Ron Valkering—CWI—Universiteit van Amsterdam—Aug. 17, 2007.*

Repairing syntax errors in LR-based parsers—Carl Cerecke—Department of Computer Science University of Canterbury—Jan. 1, 2002.*

Distributed multimedia synchronization specifications using M2EST—Chung-Ming Huangav, Ye-In Changb, Chih-Hao Lin, Jhy-Shiou Chen—Laboratory of Multimedia Networking (LMN), Institufe of Information Engineering, National Cheng Kung University, Taiwan; and Depr. of Applied Mathematics, National Sun Yat-Sen Universi@, Kaohsiung, Taiwan 1997.*

The Parser Generating System PGS—E. Klein and M. Martin—GMD—Forschungsstelle fur Programmstrukturen an der Universitat Karlsruhe, Germany—Software—Practice and Experience, vol. 19(11), 1015-1028 Nov. 1989.*

Syntax Error Handling in Scannerless Generalized LR Parsers—Ron Valkering—Master's thesis—Aug. 2007.*

A Robust Parser for theWeb Query Language Xcerpt—Clemens Ley—Sep. 2004.*

A Practical Method for LR and LL Syntactic Error Diagnosis and Recovery—Michael G. Burke and Gerald A. Fisher—Thomas J. Watson Research Center—ACM Transactions on Programming Languages and Systems, vol. 9, No. 2, Apr. 1987.*

A Practical Method for Syntactic Error Diagnosis and Recovery by Michael Burke, Gerald A. Fisher Jr.—Courant Institute New York University—1982 ACM.*

Distributed multimedia synchronization specifications using M2EST—Chung-Ming Huang, Chih-Hao Lin, Jhy-Shiou Chen—Laboratory of Multimedia Networking (LMN), Institufe of Information Engineering, National Cheng Kung University, Tainan, Taiwan, R.O.C.—Ye-In Chang—Depr. of Applied Mathematics,National Sun Yat-Sen University, Kaohsiung, Taiwan—1997.*

Repairing syntax errors in LR-based parsers—Carl Cerecke—Department of Computer Science University of Canterbury—New Zealand—Copyright 2001, Australian Computer Society, Inc.*

Syntax Error Handling in Scannerless Generalized LR Parsers—Ron Valkering—Master's thesis—Aug. 2007—Universiteit van Amsterdam.*

The Parser Generating System PGS—E. Klein and M. Martin—Software—Practice and Experience, vol. 19(11), 1015-1028 Nov. 1989.*

Burke, Michael, and Gerald A. Fisher Jr., "A Practical Method for Syntactic Error Diagnosis and Recovery," Courant Institute New York University, Jun. 6, 1982, all pages.

Burke, Michael, and Gerald A. Fisher Jr., "A Practical Method for LR and LL Syntactic Error Diagnosis and Recovery," Thomas J. Watson Research Center—ACM Transactions on Programming Languages and Systems, vol. 9, No. 2, Apr. 1987, all pages.

Cerecke, Carl, "Repairing syntax errors in LR-based parsers," Department of Computer Science University of Canterbury, Jan. 1, 2002, all pages.

International Search Report and Written Opinion for International Application No. PCT/US10/31171 mailed Jun. 28, 2010, 9 pages.

Valkering, Ron, "Syntax Error Handling in Scannerless Generalized LR Parsers," CWI, Universiteit van Amsterdam, Aug. 17, 2007, all pages.

Supplementary European Search Report, European Application No. 10765159.8-1243 / 2419825, PCT/US2010/031171, Applicant: The MathWorks, Inc., Date of Mailing: Aug. 31, 2012, pp. 1-5.

* cited by examiner

METHOD AND SYSTEM FOR SYNTAX ERROR REPAIR IN PROGRAMMING LANGUAGES

CROSS REFERENCE TO RELATED APPLICATIONS

This application is a continuation of U.S. patent application Ser. No. 12/425,054, filed Apr. 16, 2009, entitled METHOD AND SYSTEM FOR SYNTAX ERROR REPAIR IN PROGRAMMING LANGUAGES, the entire contents of which are hereby incorporated by reference herein.

BACKGROUND

Programming languages are traditionally processed by first reading program text, then dividing the program text into contiguous sets of input characters commonly referred to as tokens. Some of the tokens may be ignored in further processing (for example, comments and blank lines). The program that divides program text into tokens is called a lexical analyzer, or lexer.

The sequence of tokens is then processed into a parse tree, a data structure that organizes the input according to the basic rules that describe the programming language (i.e., the grammar rules). Such rules may describe the correct construction of statements, expressions, functions, classes, or other concepts that make up correct programs in the programming language. The program that organizes the input into a parse tree is referred to as a parser.

A number of systems exist for generating lexers and parsers from input files that describe the tokens and grammar rules for a programming language. Parsers are commonly generated from context free grammars, sometimes called BNF (Backus-Naur Form) or simply grammars. Typically, a grammar input is provided to a program called a parser generator, and this program writes another program, which is the desired parser. This parser generates parse trees that conform to the input grammar when the parser's input is correctly formed. Examples of such parser generators are Yacc and Bison.

Program text can contain errors due to incorrect input provided by the programmer. One type of error is a lexical error, which occurs when the lexer incorrectly forms a token. Examples of a lexical error include a string that does not contain a closing quote mark, or an input character that is outside of the character set of the language.

Another type of error is a syntax error, where the program text is made up of correctly formed tokens, but the tokens do not conform to the grammar. Examples include expressions with unbalanced parentheses, or an IF or WHILE statement that is missing a closing delimiter. An important part of the lexing and parsing processes is to identify and report lexical and syntax errors, respectively.

Having recognized a syntax error, there are many reasons to continue processing the program. For example, further processing may uncover additional errors, or it may provide an opportunity for extracting useful information from later functions or classes that are correctly formed. However, continued processing in the face of an error often results in interpreting subsequent correct tokens as false errors.

SUMMARY

The described embodiments present techniques for recovering from syntax errors. These techniques correct potential errors while preserving the shape of the parse tree, and the specific implementation of the techniques can be generated automatically from the grammar. In general, these techniques operate by looking back at states associated with previously-received tokens to determine pair matching status, when a synchronizing symbol is received. The techniques respond to the pair matching status determination by potentially adding a synthesized token or by deleting a token that has already been received. The techniques can use a structure referred to as a tuple (a specific example of which is a quadruple) to assist with the evaluation of the pair matching status. Some of the techniques can utilize position information, such as for example indentation information, to evaluate the pair matching status, while other techniques may ignore such information. The described embodiments may also include a technique for automatically generating the quadruples from a set of grammar rules associated with the parser. Although exemplary embodiments described herein utilize a quadruple, in general tuples of other lengths can be used.

In general, the concepts presented in the described embodiments can be applicable to correcting errors that arise from any malformed input. For example, an approach described herein may be used for correctly rendering web pages or other document format types (including, but not limited to, XML, XML schemas, or HTML).

In one aspect, the invention provides a method of recovering from syntax errors encountered by a parser during a parsing procedure. The parser includes a tuple defining a head, a middle, an end, and a synchronization point. The method includes receiving a token M that corresponds to the head of the tuple, recording an indentation characteristic of the token M, and placing the token M in a stack. The method further includes receiving a token N characterized by being the first symbol on a line, examining the stack to find a most recent head state that has not been matched with a corresponding end state, and comparing the recorded indentation characteristic of the most recent unmatched head state to an indentation characteristic of the token N. The parsing procedure continues depending on the result of the comparison as follows. If the indentation characteristic of the token N is greater than the recorded indentation characteristic of the most recent unmatched head state, then the parsing procedure proceeds without any modifications. If the indentation characteristic of the token N is less than the recorded indentation characteristic of the most recent unmatched head state, then a token corresponding to the end of the tuple is generated and placed in the input before the token N. If the indentation characteristic of the token N is equal to the recorded indentation characteristic of the most recent unmatched head state, and the token N corresponds to the middle or end of the tuple, then the parsing procedure proceeds without any modifications. If the indentation characteristic of the token N is equal to the recorded indentation characteristic of the most recent unmatched head state, and the token N corresponds to neither the middle nor the end of the tuple, a token corresponding to the end of the tuple is generated and placed in the input before the token N. The method further includes receiving a token P that corresponds to the synchronization point of the tuple, examining the stack to detect any unmatched head states, and placing in the input one or more tokens corresponding to the end of the tuple necessary to match the unmatched head states before the token P.

In one embodiment, the tuple is generated automatically when the parser is generated, as a function of an input grammar description. Another embodiment uses a multiple threading process. A first thread executes the steps of the preceding paragraph, and a second thread executes one or more acts of a conventional parsing technique. When errors are found by the second thread, at least some results from the first thread are used to produce the parse tree.

Another embodiment further includes modifying at least one aspect of a user interface that presents the parsing procedure to a user, to illustrate actions taken by the parser. The at least one aspect includes notifying the user of one or more tokens added or deleted or both during error recovery through one or more of color coding, strikethroughs, font style changes, font size changes, blinking and insertion symbols.

In another aspect, the invention provides a method of recovering from syntax errors encountered by a parser during a parsing procedure. The parser utilizes a tuple defining a head, a middle, an end, and a synchronization point. The method includes receiving a token M that corresponds to the head of the tuple and placing a state corresponding to the token M in a stack. The method further includes receiving a token P that corresponds to the synchronization point of the tuple, examining the stack to detect any unmatched head states, and placing in the stack one or more tokens corresponding to the end of the tuple necessary to match the unmatched head states. The method also includes placing the token P on the stack.

In another aspect, the invention provides a method of generating a tuple for use by a parser for recovering from syntax errors. The method includes receiving a set of grammar rules, each of which includes one or more symbol elements, and forming a set of equations where each rule forms an equation by summing the symbol elements. The method further includes identifying a start symbol element from the set of grammar rules and representing the end symbol element with a value of zero. The method also includes selecting an end symbol element from the set of grammar rules and representing the end symbol element with a value of negative one. The method includes solving the set of grammar rules such that each symbol element is represented by either a positive one, a zero, or a negative one, and the equations are satisfied. The method includes adding all symbol elements having a value of positive one to the tuple head, and adding all symbol elements having a value of negative one to the tuple end.

One embodiment further includes adding one or more middle symbol elements to the tuple middle, wherein the one or more middle symbol elements are provided by a grammar writer. The middle symbol elements may be derived from the set of grammar rules.

Another embodiment further includes choosing a different end symbol if the solving step fails to represent each symbol element by either a positive one, a zero, or a negative one, or the equations are not satisfied, and repeating the selecting, solving and adding steps.

In yet another aspect, the invention provides a method of recovering from syntax errors encountered by a parser during a parsing procedure. The parsing procedure generates a sequence of parse tree fragments, each of which is associated with a state. The method includes specifying to the parser, using a grammar input, one or more matched pairs of tokens, and associating a criterion with each specified matched pairs of tokens. Evaluating the criterion with respect to the associated matched pair produces a result value that is one of equal, less than, or greater than. The method further includes associating each state of the parsing procedure with a unique token or grammar symbol that gives rise to that state, evaluating the criterion of one or more matched pairs of tokens when the parser encounters a second token of the matched pair, and performing a predetermined action to produce a matched token pair based on evaluating the criterion.

In one embodiment, the predetermined action includes inserting a candidate token to match an existing member of a partial matched pair. In another embodiment, the predetermined action includes deleting an input token to account for lack of a matching token. The criterion may include indentation of the token pair member.

One embodiment further includes, upon discovering an error, examining active states of the parser until encountering a state associated with a token that is a first half of a matched pair, and if a second half of the matched pair would be legal in a state in which the error was recovered, inserting a candidate token representing the second half of the matched pair immediately prior to a current token. The embodiment may further including automatically establishing the criterion during construction of the parser from the input grammar description.

One embodiment further includes using a multiple threading process. At least a first thread executes one or more of the specifying, the associating a criterion, the associating of each state, or the evaluating described in the preceding paragraphs. At least a second thread executes one or more acts of a conventional parsing technique, such that when errors are detected by the second thread, at least some results from the first thread are used to produce the parse tree.

In another aspect, the invention provides a method of resolving syntax errors encountered by a parser during a parsing procedure. The parsing procedure generates a sequence of states corresponding to tokens the parser receives. The method includes receiving the tokens until a syntax error is discovered, evaluating states corresponding to tokens received prior to the syntax error to determine a state that gave rise to the syntax error, and revising the received tokens with respect to the token corresponding to the state that gave rise to the syntax error.

In one embodiment, the revising further includes inserting one or more candidate tokens within the received tokens. The one or more candidate tokens resolves the syntax error. In another embodiment, the revising further includes deleting one or more received tokens, wherein deleting the one or more received tokens resolves the syntax error.

In one embodiment, the evaluating further includes finding a token corresponding to a first member of a matched pair, and the inserting further includes inserting a candidate token that matches the first member of the matched pair. In another embodiment, the evaluating further includes discarding states corresponding to tokens received prior to the syntax error until finding the token corresponding to the first member of the matched pair.

In another aspect, the invention includes computer program product having a computer usable medium with a computer readable program code embodied therein. The computer readable program code is adapted to be executed to implement a method of resolving syntax errors encountered by a parser during a parsing procedure. The medium holds one or more instructions for receiving a token M that corresponds to the head of the tuple, recording an indentation characteristic of the token M, and placing a state corresponding to the token M in a stack. The medium holds instructions for receiving a token N characterized by being first on a line, examining the stack to find a most recent head state that has not been matched with a corresponding end state, and comparing the recorded indentation characteristic of the most recent unmatched head state to an indentation characteristic of the token N. The medium holds instructions for proceeding with the parsing procedure when the indentation characteristic of the token N is greater than the recorded indentation characteristic of the most recent unmatched head state, and for placing in the stack a token corresponding to the end of the tuple, and inserting token N in the stack when the indentation characteristic of the token N is less than the recorded indentation characteristic of the most recent unmatched head state. The medium holds instructions for proceeding with the parsing procedure when the indentation characteristic of the token N is equal to the recorded indentation characteristic of the most recent unmatched head state, and the token N corresponds to the middle or end of the tuple. The medium holds instructions for placing in the stack a token corresponding to the end of the tuple, then inserting token N in the stack when the indentation characteristic of the token N is equal to the recorded indentation characteristic of the most recent unmatched head state, and the token N corresponds to neither the middle nor the end of the tuple. The medium holds instructions for receiving a token P that corresponds to the synchronization point of the tuple, examining the stack to detect any unmatched head states, and placing in the stack one or more tokens corresponding to the end of the tuple necessary to match the unmatched head states, and placing the token P on the stack.

In another aspect, the invention includes computer program product having a computer usable medium with a computer readable program code embodied therein. The computer readable program code is adapted to be executed to implement a method of resolving syntax errors encountered by a parser during a parsing procedure. The medium holds one or more instructions for receiving a token M that corresponds to the head of the tuple and placing the token M in a stack, for receiving a token P that corresponds to the synchronization point of the tuple, examining the stack to detect any unmatched head states, and placing in the stack one or more tokens corresponding to the end of the tuple necessary to match the unmatched head states, and for placing the token P on the stack.

In another aspect, the invention includes a computer program product having a computer usable medium with a computer readable program code embodied therein. The computer readable program code is adapted to be executed to implement a method of resolving syntax errors encountered by a parser during a parsing procedure. The medium holds one or more instructions for specifying to the parser, using a grammar input, one or more matched pairs of tokens. The medium holds instructions for receiving tokens and using states corresponding to the tokens to form one or more parse tree fragments, continuing receipt of tokens until a syntax error is discovered. The medium holds instructions for evaluating states corresponding to tokens received prior to the syntax error to determine a state that gave rise to the syntax error, and for revising the received tokens with respect to the token corresponding the state that gave rise to the syntax error.

In another aspect, the invention includes a method of recovering from syntax errors encountered by a parser during a parsing procedure. The parser includes a tuple defining at least one of a head, a middle, an end, and a synchronization point. The method includes receiving a token M that corresponds to the head of the tuple, recording a position characteristic of the token M, and placing a state corresponding to the token M in a stack. The method further includes receiving a token N characterized by matching a first criterion, examining the stack to find a most recent head state that has not been matched with a corresponding end state, and comparing the recorded position characteristic of the most recent unmatched head state to an position characteristic of the token N. The method also includes placing in the stack a token corresponding to the end of the tuple, and inserting token N in the stack when the position characteristic of the token N matches a second criterion relative to the recorded position characteristic of the most recent unmatched head state, or the position characteristic of the token N matches a third criterion relative to the recorded position characteristic of the most recent unmatched head state, and the token N corresponds to neither the middle nor the end of the tuple. The method further includes receiving a token P that corresponds to the synchronization point of the tuple, examining the stack to detect any unmatched head states, placing in the stack one or more tokens corresponding to the end of the tuple necessary to match the unmatched head states, and placing the token P on the stack.

In another aspect, the invention includes a method of recovering from syntax errors encountered by a parser during a parsing procedure, wherein the parser includes a tuple defining at least one of a head, a middle, an end, and a synchronization point. The method includes receiving and placing on a stack a token M that corresponds to the head of the tuple and has an associated position characteristic, then receiving a token N having a position characteristic that satisfies a first criterion. The method further includes examining the stack to find a most recent head state that has not been matched with a corresponding end state, and comparing the position characteristic of the most recent unmatched head state to a position characteristic of the token N. The method also includes placing, in the stack, a token corresponding to the end of the tuple, and inserting token N in the stack when the position characteristic of the token N satisfies a second criterion relative to the recorded position characteristic of the most recent unmatched head state, or the position characteristic of the token N satisfies a third criterion relative to the recorded position characteristic of the most recent unmatched head state, and the token N corresponds to neither the middle nor the end of the tuple. The method further includes receiving a token P that corresponds to the synchronization point of the tuple, examining the stack to detect any unmatched head states, placing in the stack one or more tokens corresponding to the end of the tuple necessary to match the unmatched head states, and placing the token P on the stack.

DETAILED DESCRIPTION

The described embodiments present techniques for recovering from syntax errors. The techniques preserve the shape of the parse tree and can be automatically generated from the grammar. The exemplary embodiments described herein contemplate the use of context free grammars, although the term "grammar" as used herein can encompass any notation known in the art suitable for defining the syntax or other characteristics of a programming language (including, but not limited to, a graphical grammar or a lambda calculus). For ease of discussion, embodiments described herein are considered in three general categories. These categories are illustrative and are not to be construed as limiting the scope of the invention. In addition, exemplary embodiments may refer to indentation to indicate a position of one piece of information, e.g., text, with respect to another piece of information. The term indentation is illustrative and other techniques can be used to indicate the position of information without departing from the spirit of the invention.

The first category addresses nesting errors by making use of the existing indentation to produce reasonable parse trees even in the presence of syntax errors.

The second category deals with characters that are nested, but typically do not have indentation rules associated with them. Parentheses and square braces often have this functionality in programming languages. This category can be treated as a special case of the indentation concept set forth above.

The third category describes a method by which the information that drives the first two categories can be generated automatically from the grammar input file for many programming languages.

Recovery from certain types of errors is known to be particularly difficult. One error type is sometimes referred to as a nesting error, and can occur in some form in most programming languages. A nesting error occurs when a program construct (for example, a WHILE loop or a function definition) includes a sequence of other program units (often called the body of the loop or the function). The language must provide some way to define the end of the program construct. For example, in C, a span (i.e., a block of programming language components) is usually marked by curly brace pairs ({ ... }). In LISP, a span is indicated by paired parentheses. A nesting error, in short, is caused by an input that incorrectly specifies the span of some construct in the language.

For example, a common error in C is leaving out a curly brace. The result is to cause the error to be detected far from the original point of the error. For example, consider the following C/C++ code function:

```
1    int fib( int n )
2    {
3        if( n <= 2 ) {
4            return( 1 );
5        }
6        return( fib( n-1 ) + fib( n-2 ) );
7    }
```

Suppose the programmer forgot to write the left curly brace on line 3. Then the parser would detect:

```
1    int fib( int n )
2    {
3        if( n <= 2 )
4            return( 1 );
5        }
6        return( fib( n-1 ) + fib( n-2 ) );
7    }
```

Then the brace on line 2 would match the brace on line 5, ending the function, and a syntax error would be produced on line 7 because of an unmatched brace. In this case, the parser detected an error, but the location was later than the actual point where the error took place. In complicated programs, it is not unusual for a missing or extra brace to be reported dozens, or even hundreds of lines after the actual cause of the error.

This problem is so severe that some programming languages, such as Python, have done away with such nesting symbols and exclusively use indentation to determine the nesting structure of a program. While indentation solves the problems related to nesting errors, some programmers dislike using indentation because it creates other problems such as difficulties moving and generating program text.

One situation in which syntax errors are common is when program text is in the process of being edited. As part of the editing process, it can be helpful to generate a parse tree of the program under construction so that function definitions, loop structures, etc., can be identified, code folding (optional hiding of the contents of functions and other code blocks) can be supported, and indentation be automatically generated based on the structure of the program text. It is also helpful to recognize syntax errors while the program is still being edited. Errors that arise in this situation are often temporary, and are resolved as the programmer continues entering code until grammar rules are satisfied.

Nesting errors are quite common as a program is being entered or edited. For example, in the above example, suppose lines 3 thru 5 were not present, and the programmer began to enter them. For example, as the program is being entered the parser might detect:

```
1    int fib( int n )
2    {
3        if(
4            return( fib( n-1 ) + fib( n-2 ) );
5    }
```

The parser would continue to detect one or more syntax errors until the right curly brace closing the if block was entered. These syntax errors make it difficult to identify function and block boundaries correctly, leading to incomplete editor functionality and erratic indentation.

To defend against nesting errors, some editors have a feature that may automatically insert a right curly brace when a left curly brace was entered. This functionality typically must be added to the editor by hand for specific programming languages, and many programmers may find the manual addition objectionable.

Before discussing exemplary embodiments below, selected terminologies are presented to aid in discussing the embodiments. In particular, these terminologies are used to describe syntax error recovery in parsers. Parsers generated by Yacc and Bison (so-called bottom up parsers) have a finite state machine that controls a stack. The state machine begins in a special state called the start state and looks at the incoming tokens. The stack contains both states and values, typically fragments of the eventual parse tree—the state on the top of the stack is called the current state.

Depending on a current state and an incoming token, a parser may do one of four things:

1. The parser can shift (push) a new state onto the stack, typically also building a fragment of the eventual parse tree that will represent the current token and pushing this on the stack also. The parser then continues with a new current state and the next token.

2. The parser can reduce by recognizing a grammar rule. The reduce operation removes states from the stack (with their associated tree fragments), and replaces them with a new state and a tree fragment that reflects the rule that was reduced, and typically includes the fragments generated by earlier shifts and reduces when processing symbols that make up the grammar rule. The input token is unchanged by a reduce, but the current state usually changes.

3. The parser can accept the input when the end of the input has been detected, and all of the tokens have been incorporated correctly into the parse tree.
4. The parser can report an error when a token is detected in a state for which there is no legal action.

An aspect of this state machine is that each state (except the start state) has a grammar symbol associated with it. In effect, each state records the fact that the parser has identified a particular symbol, either a token or a grammar symbol describing, for example, an expression or a statement in the programming language. This process can be referred to as the generating symbol for the state.

Forms of error recovery may operate by altering either the stack or the token stream, to get past the error condition in the current state when evaluating the current token. Prior art error recovery strategies can involve removing states from the stack, in effect ignoring some of the incorrect input, and throwing away tokens (also ignoring input), attempting to reach a synchronization point. One problem with these conventional techniques is that the recovered parse tree is incomplete, and the technique may even discard the bulk of the input.

Embodiments described herein may provide error recovery techniques that preserve some or all of the structure of the existing parse tree when errors are added through editing operations.

First Category—Indentation Used as an Error Recovery Guide

Before a providing formal exposition of this embodiment, an example will help clarify what follows. In the MATLAB™ programming language, the bodies of if, for, and while statements (and others) are closed by the end keyword:

```
while <condition>
    <body of while>
end
```

Conventionally, the body of these statements is indented further than the while and end keywords are. Now, consider the situation where the parser sees:

```
while <condition>
     <body of while>
  end
```

The end is syntactically correct, but its indentation is offset since it is not vertically aligned with the while keyword. If the file is known to have syntax errors, this end may well be spurious, left over from an incorrect editing of the body. One possible strategy for error recovery would be to delete the end keyword assuming that the parser would encounter a properly indented end later to close the body of the while. Conversely, consider the following program fragment:

```
   while <condition>
       <body of while>
 end
```

In this case the end keyword is indented fewer spaces than the while that matches it. If it is determined that there are syntax errors in the file, it is plausible to consider that the end matches some construction that contains the while statement, that the while statement is in the process of being added, and that adding an end to close the while body would be a prudent error recovery strategy.

Consider what happens if lines are detected that may be part of the body, but are not the end token. The case of an if statement is instructive, a correct example of which is shown as follows:

```
if <condition>
    ...
    <text>
```

In this case, the line of text that is seen is indented more than the if keyword, so it is likely to be part of the body of the if. Conversely, if the parser encounters:

```
if <condition>
    ...
<text>
``` where the line of text is less indented than the if keyword, the program may be missing an end keyword that matches the if, and the parser may add one to make the tree correspond to the indentation. A final case, for purposes of discussion, may be:

```
if <condition>
    ...
<text>
```

Here, the text is indented the same as the if keyword. When the text begins with an end token, this is acceptable. If the text begins with certain other tokens that may be at the same indentation as if—in MATLAB these are elseif and else—the parser simply continues parsing. But if the text does not begin with one of these allowed tokens, the parser will consider adding an end to close the body of the if before processing the text line.

As part of the grammar file, the compiler writer can specify quadruples consisting of sets of tokens. As used herein, a quadruple is a grouping of four elements, where the order of the elements carries meaning Thus, the placement of an element within the quadruple has some particular significance.

In the previous example, such a quadruple might be ({if}, {elseif, else}, {end}, {EOI})

(EOI stands for token that indicates the end of the input). The four parts of these quadruples can be referred to as the head, the middle, the end, and the synchronization point. The synchronization point can be a token that, when detected, requires the rest of the quadruple to be satisfied (e.g., an end token must have been seen (or generated) to match the while). In the described embodiment, the parser creates its own quadruples, based on the end token(s). In general, the use of these quadruples is independent of the means by which they are created. Thus the quadruples could be created manually, automatically, or a combination of automatic and manual techniques. Each quadruple can consist of:

1. A set of head states, states generated by the tokens and grammar symbols that match the end token(s).
2. A set of middle tokens.
3. A set of end tokens.
4. A set of synchronization tokens.

A more detailed description of the generation of the parser's quadruples is provided later in the description of the third category of the embodiments.

Figure 1:
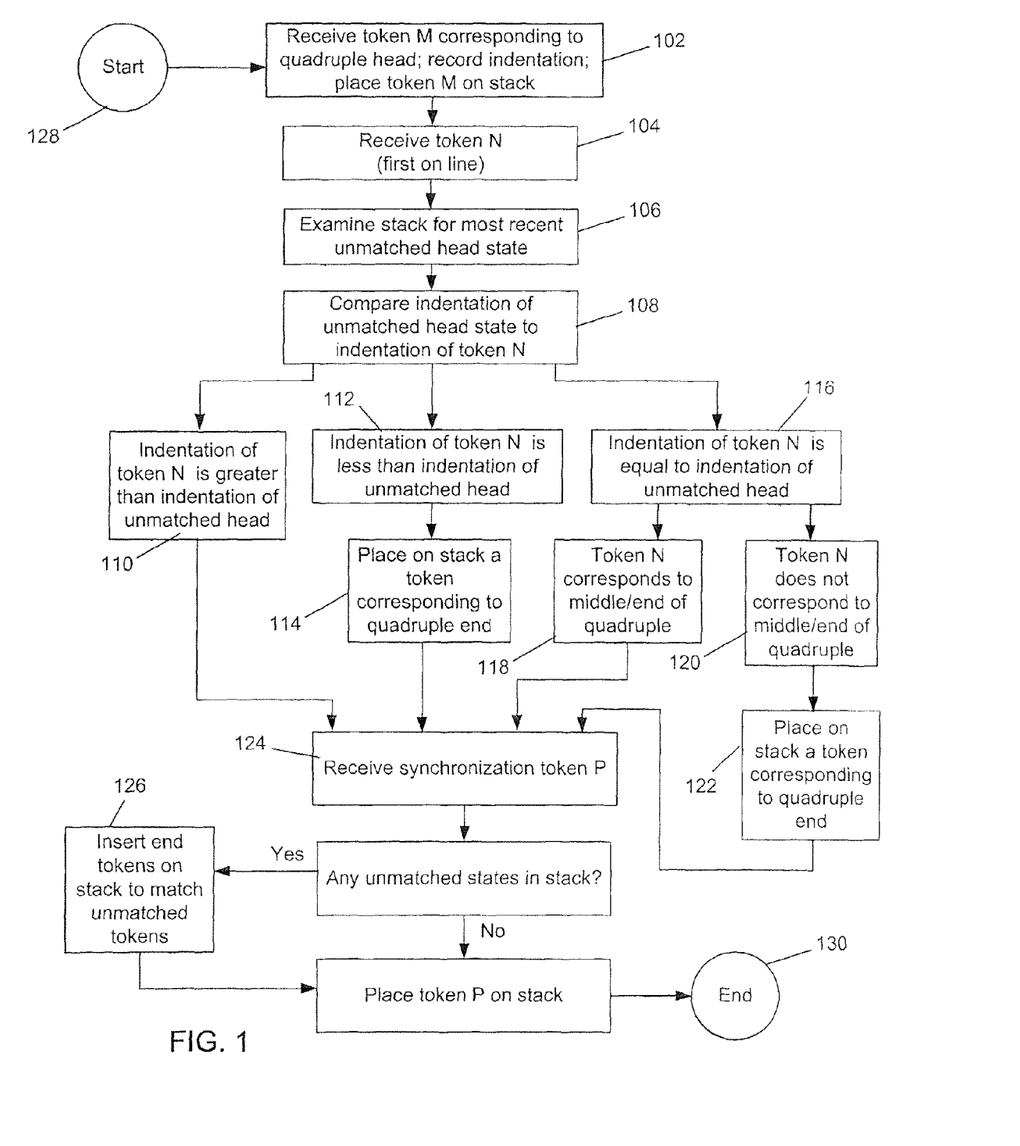
FIG. 1 shows a flow diagram according to one of the described exemplary embodiments in which indentation is used as an error recovery guide.

The parser may operate as follows (with reference to FIG. 1):

1. When the parser detects a token that corresponds to the head of a quadruple, it notes and records its indentation when the state corresponding to the token is shifted onto the stack (act 102).
2. When a token is detected that matches some criterion, for example being the first token on a line (act 104), the parser examines the stack to find the associated head state (act 106). This is the first state encountered that is a head state that has not been matched by its corresponding end state. The indentation of the head state is compared with the indentation of the current token (act 108). This comparison is made to certain criteria are met. In this example, the criteria are greater than, less than and equal to, but other embodiments may use other criteria as the basis for the comparison:
   a. If the indentation of the token is greater than that of the head state, parsing continues as usual (act 110).
   b. If the indentation of the token is less than that of the head state (act 112), a token from the end part of the quadruple is simulated ahead of the current token and parsing continues (act 114).
   c. If the indentation of the token is the same as that of the head state (act 116), and the token is in the middle or end sets of the quadruple corresponding to the head, then parsing continues as usual (act 118). Otherwise (act 120), a token is simulated as in step b, above (act 122).
3. When a token in the synchronization set of a quadruple is seen (act 124), it is not shifted (act 132) until all unmatched head states corresponding to that quadruple are closed by generating tokens from the end portion of the quadruple(s) (act 126).

The start symbol 128 and the end symbol 130 may be understood to be the beginning and the end, respectively, of a segment of the parsing procedure. This procedure may be repeated as required by the nature of the program being parsed. The end symbol 130 may, for example, may correspond to proceeding with processing of the stack.

Figure 1A:
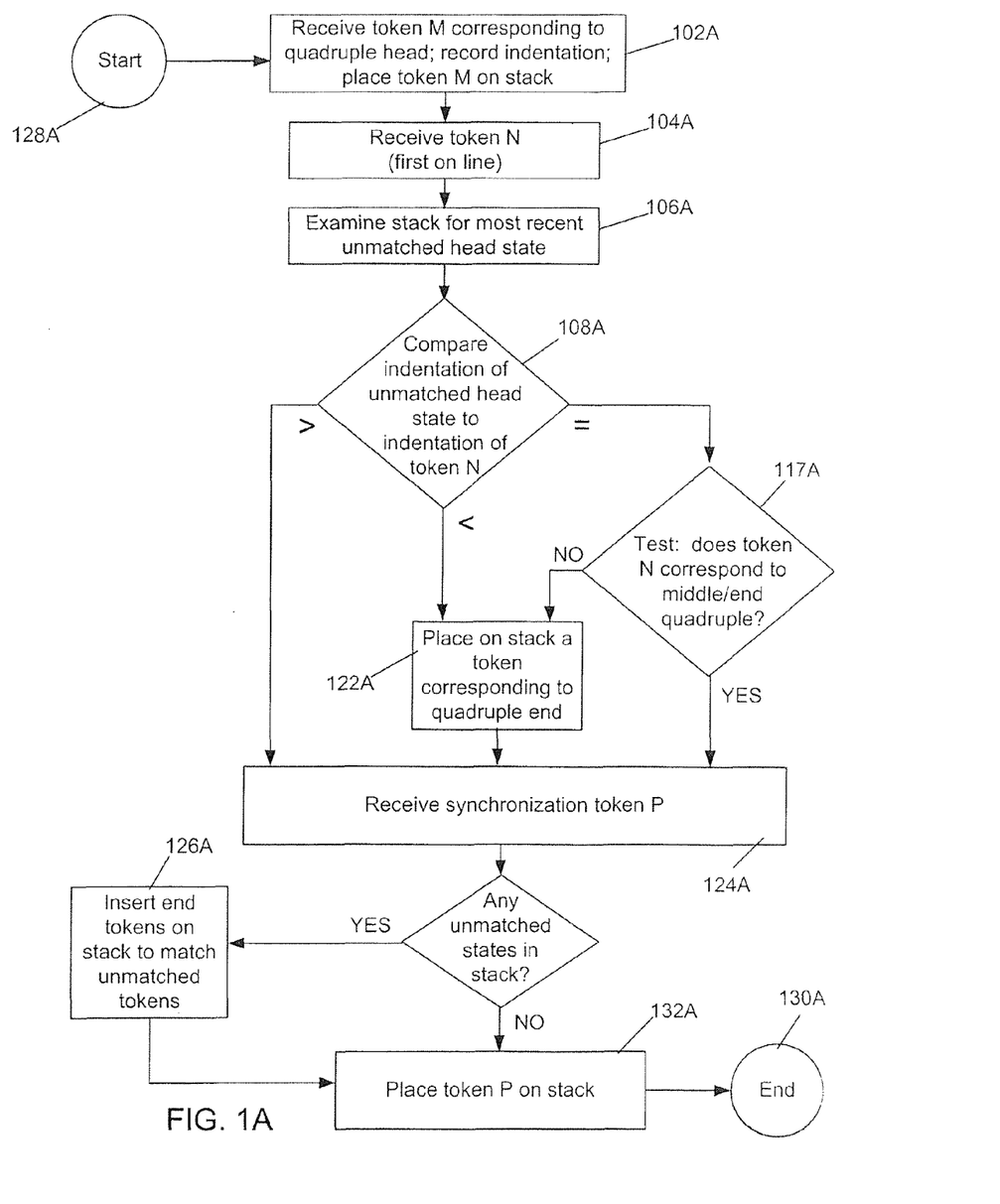
FIG. 1A shows an alternative representation of the embodiment in FIG. 1.

FIG. 1A provides an alternative, more compact view of the processing illustrated in FIG. 1. Reference blocks 102A, 104A, 106A, 124A, 126A, 128A, 130A and 132A correspond to reference blocks 102, 104, 106, 124, 126, 128, 130 and 132 of FIG. 1, respectively. Block 108A corresponds to blocks 108, 110, 112 and 116 of FIG. 1. Block 117A combines blocks 116, 118 and 120, and block 122A combines blocks 114 and 122 of FIG. 1.

With the increasing availability of multi-core computers, an alternative embodiment simultaneously parses the file using conventional techniques and also parses using the above-described embodiment. If the conventional parse finds no errors and produces a parse tree, that parse tree is used. If the conventional parse finds errors, then the parse tree generated using the above-described embodiment is used.

In some embodiments, the user is given an opportunity to provide input regarding whether a synthetic token is inserted or whether a token is deleted, as a result of the described procedure. In this way, the parsing procedure becomes semi-automatic, giving the user the ability to override a decision by the parser to modify the program.

Second Category—Indentation Not Used as an Error Recovery Guide

The following paragraphs describe a scenario in which indentation is not used, for example when dealing with errors involving parentheses and square brackets. In this embodiment, quadruples are also specified, but the middle entry is always empty. An exemplary quadruple is given by:

({left_paren}, { }, {right_paren}, {EOL, EOI})

This quadruple reflects the fact that some languages (such as MATLAB) require that parentheses be balanced when an end-of-line character is seen (assuming that no line continuation has been seen). As with the indentation case, this quadruple would require that, before an EOL was shifted to the stack, all such heads (e.g., left_parentheses) must be matched (by right_parentheses). For this embodiment, the indentation of tokens is ignored.

Figure 2:
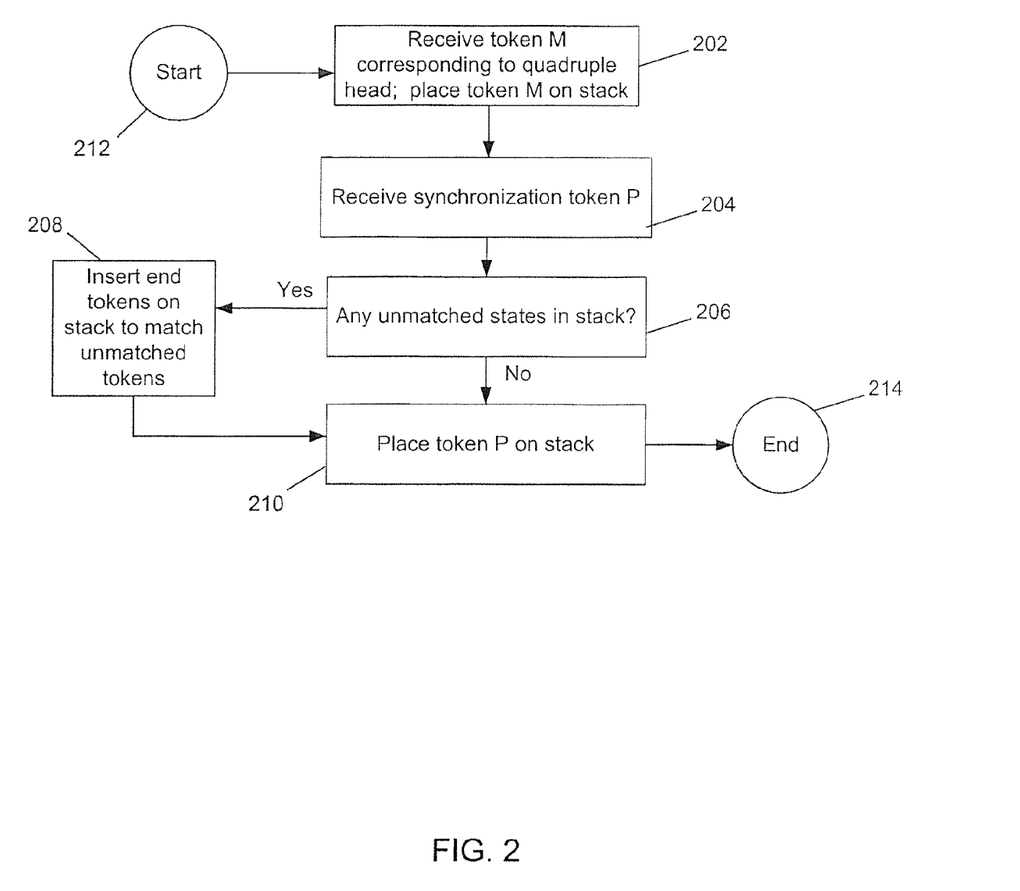
FIG. 2 shows a flow diagram according to one of the described exemplary embodiments in which indentation is ignored.

FIG. 2 illustrates the procedure of this embodiment. The parser receives a token that corresponds to the head of the quadruple, and places the token on the stack (act 202). The parser may eventually receives a token that corresponds to a synchronization point defined by the quadruple (act 204). The parser examines the stack to determine if any unmatched head states exist (act 206). If such states exist, the parser places one or more tokens corresponding to the quadruple end, necessary to matched the unmatched heads (act 208). Once the parser determines that all head states on the stack have been matched, the parser places the token that corresponds to the synchronization point on the stack (act 210).

As described for FIG. 1, the start symbol 212 and the end symbol 214 are understood to be the beginning and the end, respectively, of a segment of the parsing procedure. This procedure may be repeated as required by the nature of the program being parsed.

The exemplary embodiments described herein show synthetic tokens added to the token stream to form matched pairs. Other embodiments may operate similarly to delete tokens, thereby eliminating unmatched pairs.

In practice, the quadruples contain grammar symbols as well as tokens. For example, consider the following example derived from the MATLAB grammar:

```
if_clause   : IF expr EOL statements
            | if_clause elseif_clause
            ;
elseif_clause: ELSEIF expr EOL statements
            ;
statement   : if_clause END EOL
            | if_clause ELSE statements END EOL
            ...
```

The first two rules specify that an if_clause is made up of the first part of the if statement, including the if keyword, the conditional expression, and the first set of statements, but is then followed by zero or more elseif_clause constructions. The elseif_clause is made up of an elseif keyword, a conditional expression, and the statements controlled by this condition. Finally, the if statement is made up of an if_clause followed by an end keyword, or an if_clause followed by an ELSE token followed by statements and then the end keyword.

When an if_clause is recognized, the if keyword is incorporated into the if_clause construction. If a state generated by if_clause is on the stack, it needs to be treated as if it were an if keyword, because the matching end has not yet been recognized. Accordingly, in this case the quadruple for if is ({if, if_clause}, {elseif, else}, {end}, {EOI})

Third Category—Generating the Quadruples

Figure 3:
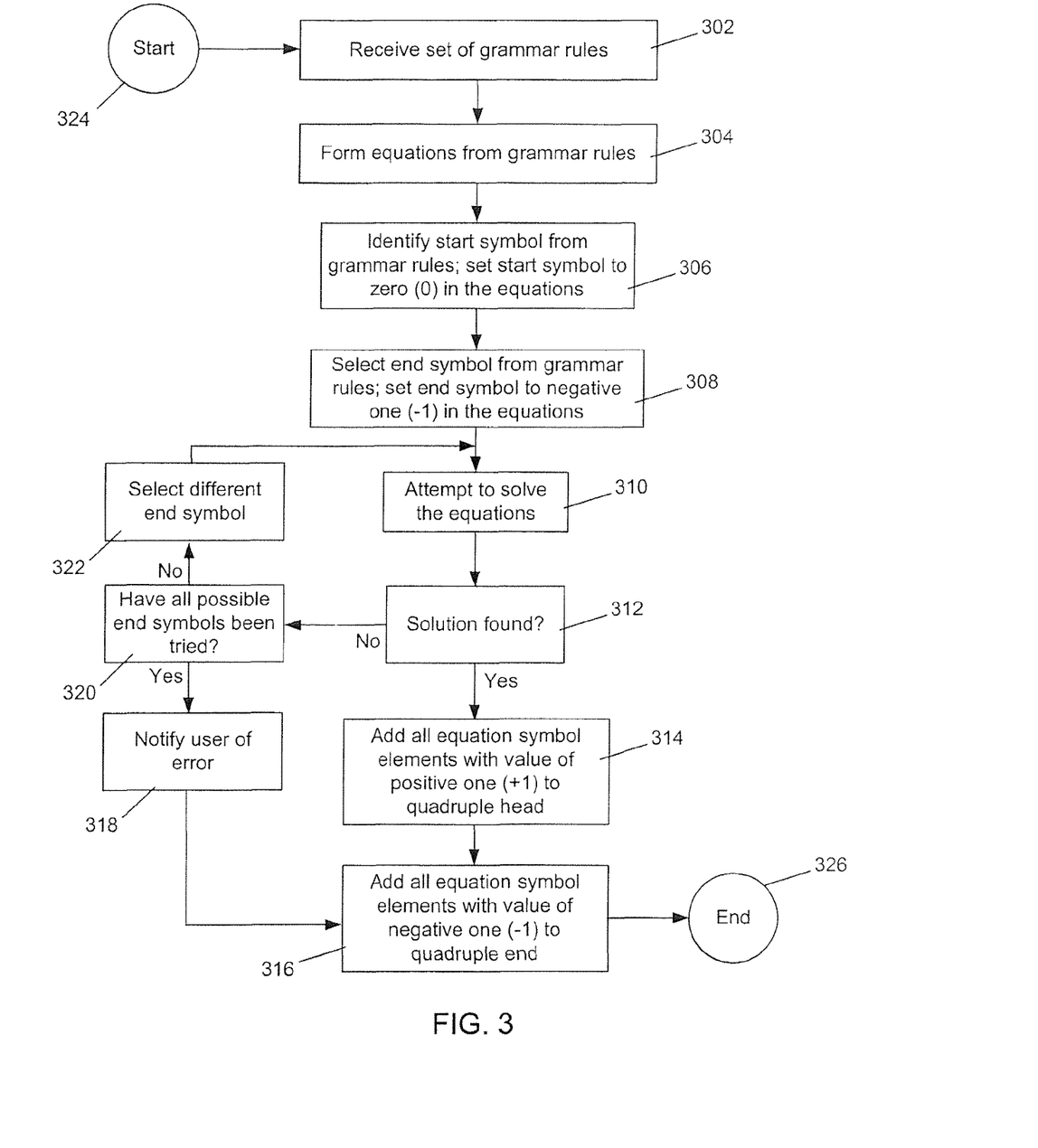
FIG. 3 shows a flow diagram according to one of the described exemplary embodiments in which a quadruple as used in FIGS. 1 and 2 is generated from a set of grammar rules.

For many languages, most of the information about quadruples can be generated automatically by the parser generator. In fact, this generation can also, in some cases, uncover errors in the construction of the grammar. The quadruple generation according to this embodiment is shown in FIG. 3.

The process begins with only a candidate end symbol. The following process generates a quadruple associated with this end symbol by adding tokens and grammar symbols to the head portion of the quadruple, and synchronization tokens, if any, to the synchronization portion of the quadruple.

The process treats the received set of grammar rules (act 302) as a set of simultaneous equations (act 304), where each token or grammar symbol is an unknown. The process begins by setting the selected end symbol(s) to −1 (act 308), and the start symbol of the grammar to zero (act 306). The process then attempts to solve these equations by giving a value to each symbol (act 310). These equations are considered to be solved (act 312) if every symbol has the value 0, 1, or −1, and the equations are satisfied. If the equations cannot be solved, then there may have been a problem with the grammar (in which case the user is notified (act 318)) or with the choice of the initial end symbol. If all potential end symbols have not yet been tried (act 320), a different end symbol is selected (act 322) and the parser generator attempts to solve the equations with the new end symbol.

When a solution is found, the process adds to the head of the quadruple states corresponding to all grammar symbols and tokens having the value +1 (act 314), and add to the end of the quadruple states corresponding to all grammar symbols having the value −1 (act 316).

As described for FIGS. 1 and 2, the start symbol 324 and the end symbol 326 are understood to be the beginning and the end, respectively, of a segment of the parsing procedure. This procedure may be repeated as required by the nature of the program being parsed.

The process may also augment the synchronization points. Whenever a grammar rule is found that derives a symbol with the value zero, and contains a token that is preceded by symbols that sum to zero, that token becomes a candidate to be a synchronization symbol for the quadruple. If all appearances of that token in the grammar have this property, the token can be added to the synchronization set for the quadruple. Since the start symbol sums to zero, and typically the only appearance of the EOI token is preceded by the start symbol, EOI is usually part of the synchronization set. The same kind of operation is performed for end symbols that respect indentation as for those that do not.

The middle symbols in the quadruple must be added by the grammar writer, because these symbols depend on the conventions for indentation rather than the grammar. In fact, if there are several different styles of indentation conventionally used by the editor, the editor might tell the parser to use different middle sets.

Note that this process as described involves examining all or nearly all quadruples, and solving a set of equations for each. However, this process takes place infrequently, when the parser is generated from the grammar. Moreover, the structure of the equations can eliminate many variables from contention as matched pairs. Some embodiments can adjust parameters related to the process running time such that those parameters are optimized relative to a particular parser, in order to avoid parser-generation performance issues.

Example of Automatic Generation

Suppose a grammar contains the following rules, among others. E will represent expressions, S represents statements, and SL a statement list, i.e., a list of statements (and the start symbol for the grammar).

SL:
SL: SL S
S: IF E SL END
S: IF E SL ELSE SL END
S: WHILE E SL END
S: E SEMI
S: SEMI

To generate the quadruple associated with the END symbol, END is set to −1 and the equations are written:

SL=0
SL=SL+S
S=IF+E+SL−1
S=IF+E+SL+ELSE+SL−1
S=WHILE+E+SL−1
S=E+SEMI
S=SEMI

The first two equations show that SL and S must both have the value 0. Since S and SL are 0, SEMI must also be, and thus E must also be 0. The first equation implies that IF must have the value of 1. The second equation implies that ELSE is 0. Finally, WHILE must also have the value 1. The parser's quadruple becomes ({IF, WHILE}, { }, END, EOI)

Conversely, starting with the symbol ELSE, and setting it to the value −1, produces an inconsistent set of equations. Again, we note that adding ELSE to the middle set of this quadruple must be done by an explicit action of the grammar writer.

As an exemplary extension to the concept described above, consider the addition of ELSE to the middle set of this quadruple:

({IF, WHILE}, ELSE, END, EOI)

Then consider the input

---
while <condition>
...
else

---

Because the ELSE token is in the middle set of the quadruple, the described embodiment will simply go ahead and parse the else, leading to a syntax error. In fact, there is no particularly compelling way to recover from this error, so this outcome is reasonable. If desired, additional refinement could be added to the this embodiment by associating tokens in the middle set with specific head symbols, or alternatively checking whether the middle symbol that is seen could be legally processed from the state where it was seen. If the symbol appeared incorrect, more extreme forms of recovery might be attempted (such as changing the while to an if).

Other extensions similar in scope to this example of adding an ELSE to the quadruple may be included in alternative embodiments. To optimize performance, these embodiments may tailor the operation associated with a particular extension according to the specific parser, target applications, and/or unique events and outcomes related to the extension.

With the previously-described embodiments, a program that is formally syntactically correct but incorrectly indented will generate messages and add and/or delete tokens. As mentioned earlier, to avoid this situation, the previously-described embodiments can be used only after a syntax error has been detected by a conventional parser. In one embodiment, a multithreading process may be used in conjunction with the techniques described herein. For example, one thread of a multithreading process would execute the embodiments previously described, and another thread of the multithreading process would execute a conventional parser.

Alternatively, the conventional parser could be executed first, and the previously-described embodiments could be executed after the execution of the conventional parser. In one embodiment, the previously-described embodiments could be executed only if the conventional parser detected errors.

For any of the embodiments described herein, modifications to the parsing procedure (e.g., adding or deleting tokens or both) may be indicated to the user through a graphical user interface (GUI). For example, the modifications may be indicated through color coding, where a specific color highlighting can indicate an inserted token, and highlighting of a different color can indicate a deleted token. Further, color highlighting, diagnostic messages, strikethroughs, font style changes, font size changes, blinking and insertion symbols, or other visual indicators may be used to alert the user of these modifications.

The embodiments described herein can be implemented on any computer system (e.g., desktop, laptop or notebook PC, mobile handheld computing system or workstation) known in the art. The described embodiments may be implemented in a computer program product tangibly embodied in a machine-readable storage medium for execution by the computer system. The methods of the described embodiments may be performed by the computer system executing a program to perform functions of described herein by operating on input data and generating output.

Figure 4:
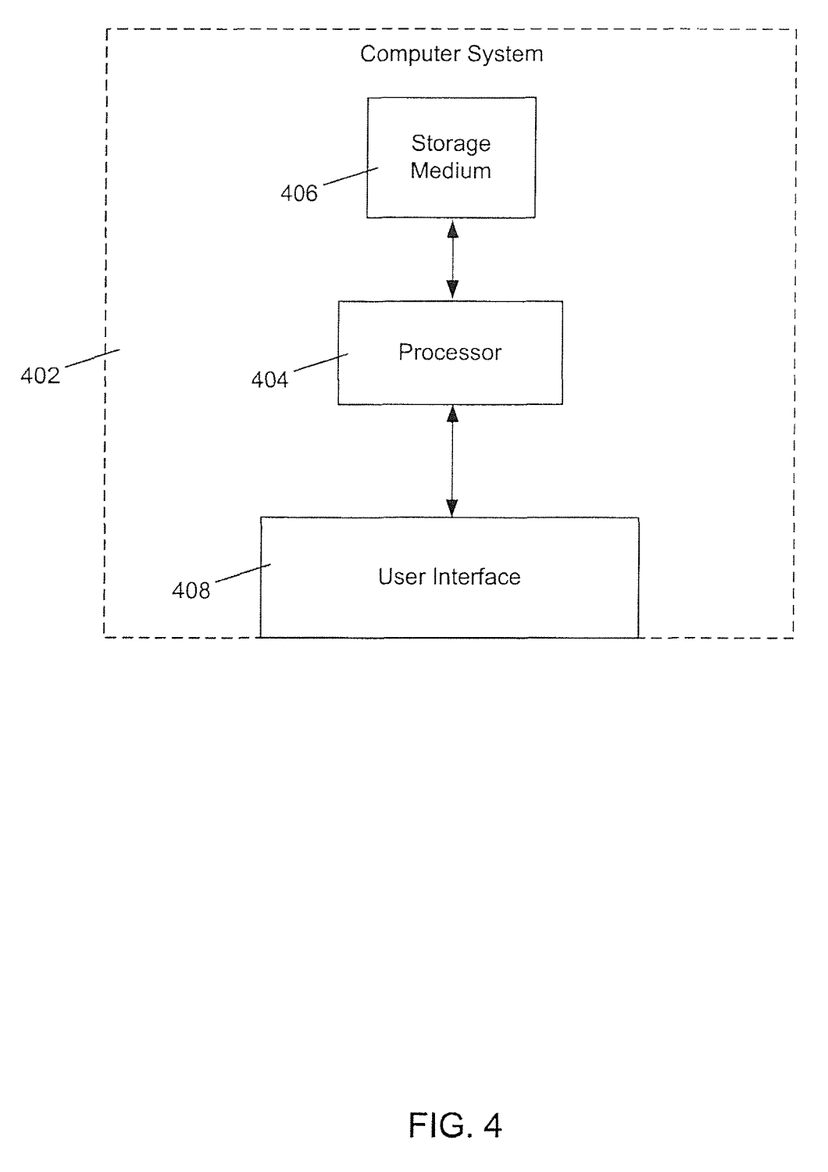
FIG. 4 shows an example of a computer system that may be used to implement the described embodiments.

An exemplary computer system 402 is shown in FIG. 4, including a processor 404, an information storage medium 406, and a user interface 408. These components may be contained within a typical desktop, laptop or mobile form factor housing, or they may be integrated into a single component such as a multi-chip module or ASIC (application specific integrated circuit).

Suitable processors 404 include, for example, both general and special purpose microprocessors. Generally, the processor receives instructions and data from a read-only memory (ROM) and/or a random access memory (RAM) through a CPU bus. The processor 404 can also receive programs and data from a storage medium 406 such as an internal disk operating through a mass storage interface, or a removable disk operating through an I/O interface. Instructions for executing the described embodiments are stored on the storage medium.

Information storage media 406 suitable for tangibly embodying computer program instructions for implementing the described embodiments include all forms of non-volatile memory known in the art, including but not limited to, semiconductor memory devices, such as EPROM, EEPROM, and flash memory devices, magnetic disks such as internal hard disks and removable disks, magneto-optical disks, and CD-ROM disks. The information storage medium 406 also stores an operating system ("OS") such as Windows or Linux, which the processor executes to provide a supervisory working environment for the user to execute and control the described embodiments as well as other software applications available on the computer system.

The user interface 408 may include a keyboard, mouse, stylus, microphone, trackball, touch-sensitive screen, or other input device. These elements well known in the art and are generally found in a conventional desktop computer as well as other computers and workstations suitable for executing computer programs implementing the methods described herein. The computer system 402 may also be used in conjunction with any display device for providing a graphical user interface (GUI), or other raster output device capable of producing color or gray scale pixels on paper, film, display screen, or other output medium.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of recovering from one or more syntax errors encountered by a parser during a parsing procedure, the method comprising:
   storing, in a memory, a tuple for a computer programming language, the tuple having
      a head token corresponding to a start symbol of the programming language,
      an end token corresponding to an end symbol of the programming language, and
      a synchronization point that indicates an end of a code input that began with the start symbol and ended with the end symbol, wherein the tuple is utilized to recover from the one or more syntax errors;
   receiving a computer program written in the programming language, the programming language having a set of grammar rules;
   dividing the computer program into tokens based on the set of grammar rules;
   identifying, by a processor coupled to the memory, a first of the tokens, token M, that corresponds to the head token of the tuple;
   placing a state corresponding to the token M in a stack;
   identifying, by the processor, a second of the tokens, token P, that corresponds to the synchronization point of the tuple; and
   performing at least one of:
      adding a synthesized token to the stack, when a matching end token is not found for the token M, the synthesized token based on the end token of the tuple, and
      deleting one of the tokens, when first and second matching end tokens are found for the token M based on the end token of the tuple, the one of the tokens being deleted is either the first matching end token or the second matching end token.

2. The method of claim 1, wherein the tuple is generated automatically when the parser is generated, as a function of an input grammar description.

3. The method of claim 1, further comprising:
   utilizing a first thread of a multiple threading process to identify the first and second tokens; and
   executing one or more acts of a conventional parsing technique via a second thread, such that when errors are detected by the second thread, at least some results from the first thread are used to produce a parse tree.

4. The method of claim 1, further including modifying at least one aspect of a user interface that presents the parsing procedure to a user.

5. The method of claim 4, wherein the at least one aspect includes notifying the user of the synthesized token, the deleted token, or both during error recovery through one or more of color coding, strikethroughs, font style changes, font size changes, and blinking and insertion symbols.

6. The method of claim 1, wherein the start symbol and the end symbol are parentheses.

7. The method of claim 1, wherein the tuple further includes one or more grammar tokens representing grammar symbols of the programming language.

8. The method of claim 1, wherein the tuple further includes a middle token corresponding to a middle symbol element derived from the set of grammar rules.

9. A computer program product, including a non-transitory computer usable medium having a computer readable program code embodied therein, the computer readable program code adapted to be executed to implement a method of resolving one or more syntax errors encountered by a parser during a parsing procedure, the medium holding one or more instructions for:

storing, in a memory, a tuple for a computer programming language, the tuple having
        a head token corresponding to a start symbol of the programming language,
        an end token corresponding to an end symbol of the programming language, and
        a synchronization point that indicates an end of a code input that began with the start symbol and ended with the end symbol, wherein the tuple is utilized to resolve the one or more syntax errors;
    receiving a computer program written in the programming language, the programming language having a set of grammar rules;
    dividing the computer program into tokens based on the set of grammar rules;
    identifying a first of the tokens, token M, that corresponds to the head token of the tuple
    placing a state corresponding to the token M in a stack;
    identifying a second of the tokens, token P, that corresponds to the synchronization point of the tuple; and
    performing at least one of:
        adding a synthesized token to the stack, when a matching end token is not found for the token M, the synthesized token based on the end token of the tuple, and
        deleting one of the tokens, when first and second matching end tokens are found for the token M based on the end token of the tuple, the one of the tokens being deleted is either the first matching end token or the second matching end token.

10. The computer program product of claim 9, wherein the tuple is generated automatically when the parser is generated, as a function of an input grammar description.

11. The computer program product of claim 9, further comprising one or more instructions for modifying at least one aspect of a user interface that presents the parsing procedure to a user, the at least one aspect notifying the user of the synthesized token, the deleted token, or both during error recovery.

12. The computer program product of claim 9, wherein the start symbol and the end symbol are parentheses.

13. The computer program product of claim 9, wherein the tuple further includes one or more grammar tokens representing grammar symbols of the programming language.

14. The computer program product of claim 9, wherein the tuple further includes a middle token corresponding to a middle symbol element derived from the set of grammar rules.

15. An apparatus comprising:
    a memory storing a tuple for a computer programming language, the tuple having
        a head token corresponding to a start symbol of the programming language,
        an end token corresponding to an end symbol of the programming language, and
        a synchronization point that indicates an end of a code input that began with the start symbol and ended with the end symbol, wherein the tuple is utilized to recover from one or more syntax errors; and
    a processor coupled to the memory, the processor configured to:
        receive a computer program written in the programming language, the programming language having a set of grammar rules;
        divide the computer program into tokens based on the set of grammar rules;
        identify a first of the tokens, token M, that corresponds to the head token of the tuple;
        place a state corresponding to the token M in a stack;
        identify a second of the tokens, token P, that corresponds to the synchronization point of the tuple; and
        perform at least one of:
            add a synthesized token to the stack, when a matching end token is not found for the token M, the synthesized token based on the end token of the tuple, and
            delete one of the tokens, when first and second matching end tokens are found for the token M based on the end token of the tuple, the one of the tokens being deleted is either the first matching end token or the second matching end token.

16. The apparatus of claim 15, wherein the tuple is generated automatically when a parser is generated, as a function of an input grammar description.

17. The apparatus of claim 15, wherein the processor is further configured to:
    utilize a first thread of a multiple threading process to identify the first and second tokens; and
    execute one or more acts of a conventional parsing technique via a second thread, such that when errors are detected by the second thread, at least some results from the first thread are used to produce a parse tree.

18. The apparatus of claim 15, wherein the processor is further configured to notify a user of the synthesized token, the one or more deleted tokens, or both during error recovery through one or more of color coding, strikethroughs, font style changes, font size changes, blinking, and insertion symbols.

19. A method of recovering from syntax errors encountered by a parser during a parsing procedure, wherein the parser includes a tuple defining at least one of a head, a middle, an end, and a synchronization point, the method comprising:
    receiving a token M that corresponds to the head of the tuple, recording a position characteristic of the token M, and placing a state corresponding to the token M in a stack;
    receiving a token N characterized by matching a first criterion;
    examining the stack to find a most recent head state that has not been matched with a corresponding end state, and comparing the recorded position characteristic of the most recent unmatched head state to a position characteristic of the token N;
    placing in the stack a token corresponding to the end of the tuple, and inserting token N in the stack when the position characteristic of the token N matches a second criterion relative to the recorded position characteristic of the most recent unmatched head state, or the position characteristic of the token N matches a third criterion relative to the recorded position characteristic of the most recent unmatched head state, and the token N corresponds to neither the middle nor the end of the tuple; and
    receiving a token P that corresponds to the synchronization point of the tuple, examining the stack to detect any unmatched head states, placing in the stack one or more tokens corresponding to the end of the tuple necessary to match the unmatched head states, and placing the token P on the stack.

20. A method of recovering from syntax errors encountered by a parser during a parsing procedure, wherein the parser includes a tuple defining at least one of a head, a middle, an end, and a synchronization point, the method comprising:

receiving and placing on a stack a token M that corresponds to the head of the tuple and has an associated position characteristic, then receiving a token N having a position characteristic that satisfies a first criterion;

examining the stack to find a most recent head state that has not been matched with a corresponding end state, and comparing the position characteristic of the most recent unmatched head state to a position characteristic of the token N;

placing in the stack a token corresponding to the end of the tuple, and inserting token N in the stack when the position characteristic of the token N satisfies a second criterion relative to the recorded position characteristic of the most recent unmatched head state, or the position characteristic of the token N satisfies a third criterion relative to the recorded position characteristic of the most recent unmatched head state, and the token N corresponds to neither the middle nor the end of the tuple; and receiving a token P that corresponds to the synchronization point of the tuple, examining the stack to detect any unmatched head states, placing in the stack one or more tokens corresponding to the end of the tuple necessary to match the unmatched head states, and placing the token P on the stack.

* * * * *